3,515,469
CINEMATOGRAPHIC PROJECTOR
Wilhelm Winzenburg, Dresden, Germany, assignor to VEB Pentacon Dresden Kamera- und Kinowerke, Dresden, Germany
Filed Aug. 28, 1967, Ser. No. 663,700
Int. Cl. G03b *21/32*
U.S. Cl. 352—40                         2 Claims

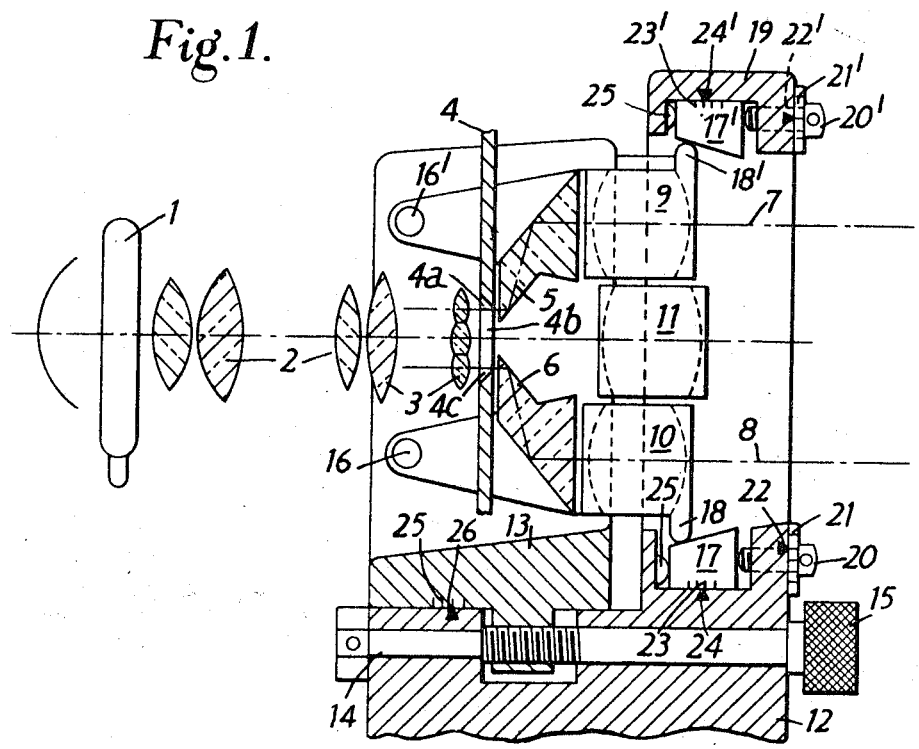
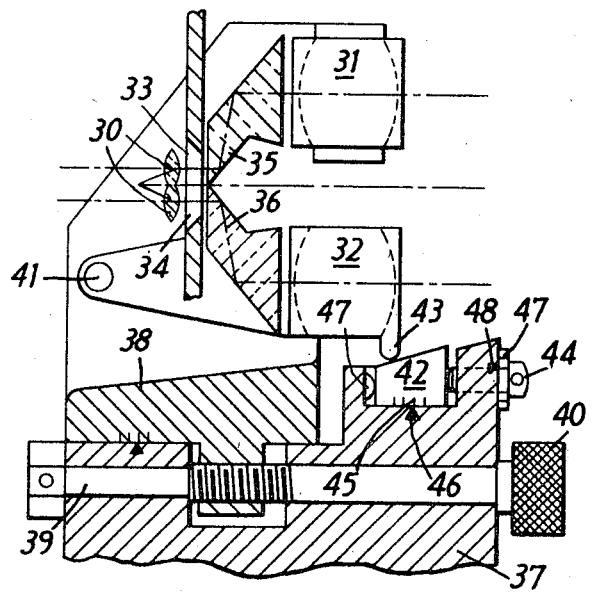

ABSTRACT OF THE DISCLOSURE

A cinematographic projector is constructed with a film gate which can accommodate at least two successive frames at any instant and with at least two lens systems effecting projection through the gate. The images produced by the lens system are mutually superimposed upon a single screen. The distance between the axes of the two lens systems is greater than the frame pitch.

---

Background of invention

The invention relates to a cinematographic projector with a device for increasing the light efficiency in the reproduction of moving pictures without increasing the radiation of heat onto the film beyond the permissible level, and particularly intended for narrow-gauge film, a number of successive images of a film being specially projected, with the use of a correspondingly large gate on the cinematographic projector, the successive images at the same time merging into one another more satisfactorily, thus obtaining a better cinematographic effect.

A process is known for increasing the light efficiency in the reproduction of moving pictures, with the use of two similar projectors, which run synchronously with two films of the same content, the projected images coinciding on the screen and thus providing a cumulative illumination density. The drawback of this system is the considerable expense involved, as two projectors and two similar copies of the film are required. This process proves particularly unsatisfactory if one of the two films happens to break during the projection. For the performance to continue, exactly equal copies have to be produced, which obviously detracts from the practical applicability of the method.

According to another known process and the relevant device for obtaining the effect of spatial depth in the reproduction of moving pictures, a cinematographic projector and a film strip are used to obtain each individual image twice on a screen, from two adjacent images, with the use of a corresponding large gate and a common illumination system and separate projection beams. This system does not enable the light efficiency or the illumination density of the projected images to be increased, because owing to the use of polaroid filters or grids, which are intended to produce the effect of spatial depth, over 50% of the light flux is absorbed, and the projection lenses are mounted at a distance corresponding to a film "step" and are cut accordingly.

The purpose of the invention is to enable the aforementioned drawbacks to be avoided and to ensure that the successive images in the reproduction merge into one another more satisfactorily.

The task to be performed by the invention is that of obtaining a double to treble light efficiency in the projection of cinematographic films without exceeding the maximum permissible thermal loading of the film and with only one cinematographic projector, with the use of a film strip of the customary type, particularly a narrow-gauge film, improving the impression produced, particularly the stroboscopic effect of the individual parts of the picture which are in motion.

By stroboscopic effect is meant the process of combining individual intrinsically motionless images, with different phases of movement, to form a continuous movement, or of causing them to give this impression.

Summary of invention

The invention enables this problem to be solved by a method for increasing the light efficiency in the reproduction of moving pictures by the special projection of a number of pictures with the use of a correspondingly large gate and at the same time improving the effect of the projection by an advantageous merging of the successive pictures, wherein at least two successive pictures of a film are projected with one single projector having at least two mutually superimposed lens systems directed simultaneously onto one single screen in such a way that the images are mutually superimposed, the distance between the axes of the lens system being greater than the film pitch.

The advantages of the invention are that only one single cinematographic projector is used and that the illumination density obtained in the image projected is two to three times greater, thus considerably increasing the brilliancy and the size of the screen likewise, particularly where colour films are concerned, and at the same time improving the impression made by the picture, by facilitating the production of the stroboscopic effect.

The device to which the invention relates is based on the realization that with the normal cinematographic projection with 24 pictures per second and with a 2-part diaphragm, resulting in 48 periods, the moving picture perceived by the human eye consists of the picture being projected in each case and of three succeeding pictures, the so-called "adhering pictures" of the picture already projected. Altogether, there are constantly four pictures, with different movement phases, merging into one moving picture. If the individual images of a film are given consecutive numbers, then the following is perceived on the screen when the film is being run off and the fourth image of the film is present in the normal gate:

For $\frac{1}{24}$ sec., the projected image of picture, 1, 2, 3 and 4, then for $\frac{1}{24}$ sec. the projected image of pictures 2, 3, 4 and 5, then $\frac{1}{24}$ sec. the projected image of pictures 3, 4, 5 and 6, and so forth.

In order to avoid flicker, each period of $\frac{1}{24}$ sec. is also interrupted twice, for $\frac{1}{96}$ sec. So much for the known cinematographic projection method.

According to the invention, the problem is to be solved by the projection of two to three pictures through a correspondingly larger gate, the illumination density of the projected images, accurately superimposed on one another on the screen, thus being rendered cumulative. With two pictures projected at the same time, the following is then perceived on the screen:

For $\frac{1}{24}$ sec. the projected image of pictures 1, 2, 3 and 4 plus the mutually coincident pictures 2, 3, 4 and 5 followed for $\frac{1}{24}$ sec. by the projected image of pictures 2, 3, 4 and 5 plus the coincident pictures 3, 4, 5 and 6, and so forth.

In a comparison with the projected images perceived in the same period of $\frac{1}{24}$ sec., including "adhering images," in the case of ordinary cinematographic projection, it is found that the four normal pictures of the same light intensity, e.g., images 3, 4, 5 and 6, are supplemented by a picture 6, the pictures 3, 4 and 5 being doubled in their light intensity while pictures 2 and 6 appear with single light intensity.

With three simultaneously projected pictures, the following is perceived on the screen:

For $\frac{1}{24}$ sec. the projected image of picture 1, 2, 3, 4
Plus the mutually coincident pictures 2, 3, 4, 5
Plus the mutually coincident pictures 3, 4, 5, 6

This is followed, for 1/24 sec. by the projected image of
Pictures 2, 3, 4, 5
Plus the mutually coincident pictures 3, 4, 5, 6
Plus the mutually coincident pictures 4, 5, 6, 7

A comparison with normal projection methods shows that in this case the four normally projected pictures of equal light intensity are supplemented by a final picture 1 preceding the fading and by a new picture 6, both of single brightness, while the pictures 3 and 4 take effect with triple brightness and the pictures 2 and 5 with double brightness. Owing to the gradation of the brightness and to the additional pictures of comparatively limited light intensity tthe successive pictures are caused to merge into one another more satisfactorily in the two cases described in the foregoing, and at the same time a picture of a better quality is obtained, owing to the more favourable stroboscopic effect, as regards the merging of the movement. With narrow-gauge films, with a taking and reproduction frequency of 16 pictures per second and with a three-part diaphragm, similar results are obtained. In this system, there is one follow-up picture less to take effect in all cases, no matter whether two pictures are projected or three.

Brief description of drawings

The invention will be illustrated and described in conjunction with two practical examples.

In the drawing:

FIG. 1 is a schematic diagram of a cinematographic projector with three lens units, while FIG. 2 illustrates a cinematographic projector with two lens units.

Description of preferred embodiments

From a light source 1 the rays are conveyed, through a suitable condenser system 2 and 3, which ensures the complete utilization of the lens, to the three gates 4a, 4b and 4c, superimposed on one another. With the upper gate 4a and the lower gate 4c are associated the prisms or mirrors 5 and 6, by which the optical axes 7 and 8 provided by the gates 4a and 4c are placed so far apart that use can be made of projection lenses 9 and 10 with the customary aperture ratios and the central lens 11 can also be provided, between lenses 9 and 10, for the gate 4b. The prisms 5 and 6 are rigidly mounted on the cinematographic projector 12, not shown, or on the gate frame 4, while lenses 9, 10 and 11 are movable on a support or slide 13 in respect of the gates 4a to 4c, by means of one single adjusting screw 14 and a knob 15, for the purpose of the sharp focusing of the projected pictures. The reading of the setting can be taken opposite a fixed mark 26 on a scale 25. When being focused, the lenses 9 and 10 are automatically pivoted about the shafts 16 and 16' by the control curves 17 and 17' and the control cams 18 and 18', so that the parallax is eliminated, no matter what the distance of the screen, and the projected images are caused to coincide with one another correctly as regards their level. The control wedges 17 and 17' are affixed with the slide 19 on the cinematographic projector 12 and can be adjusted by means of fine-adjustment screws 20 and 20' in relation to resilient or displaceable elements 25 and 47 respectively, in order to compensate any shrinkage which has occurred in the case of comparatively old films. The reading can be taken from scales 21 and 21', opposite a fixed mark 22, 22', 23, 23' and 24, 24' respectively.

According to FIG. 2, the rays from a light source, not shown, are shown, in part only, passing through a suitable condenser system 30, which again enables the lens 31 and 32 to be fully utilized, until they reach the gates 33 and 34, superimposed on one another. After the upper gate 33 and the lower gate 34, the prisms 35 and 36 are mounted in a fixed position in respect of the gates 33 and 34 and the cinematographic projector 37. The lenses 31 and 32 are mounted on a support or slide 38 which can be moved by means of an adjusting screw 39 and by rotating the knob 40, for the sharp focusing of the projected images together. The lens 32, in the sharp focusing operation, is pivoted about the shaft 41, by means of the control curve 42 and via the cam 43, in such a way that the parallax is eliminated, no matter what the distance of the image, and the projected images are caused to coincide correctly with one another as regards their level. In order to counteract any shrinkage which has occurred in older films, an additional fine-adjustment device 44 is provided for the control curve 42. The adjustment can be ascertained opposite a fixed mark 46, 47 or 48 on a scale 45.

I claim:

1. A cinematographic projector for reproducing moving pictures provided on cinematographic film of the normal kind having a single sequence of differing pictures, including a housing; light source means arranged in the housing; film gate means arranged to allow simultaneous illumination of at least two successive film pictures; at least two optical paths each arranged to receive one of the picture images produced by the illumination of the film pictures, said optical paths each including a lense and mirrors or prisms positioned between the lens and the film gate means in order to increase the distance between the optical axes of the lenses; slidable support means for supporting said lenses being slidable on said housing; a film gate frame on which are fixedly attached said mirrors or prisms; control wedges arranged to co-operate with cams on the lens mounts to effect pivotal movement of the lenses; and adjustable screw means connected with said support means for moving said lenses relative to said control wedges thereby to eliminate the parallax of the separately positioned lenses.

2. A projector as claimed in claim 1, wherein in order to compensate for film shrinkage there are provided, further adjusting screw means for effecting movement of the control wedges; first scale means associated with said adjusting screw means; second scale means associated with the control wedges; and resilient means arranged to oppose movement of said control wedges.

References Cited

UNITED STATES PATENTS 1,714,849  5/1929  Daponte _____ 352—43
2,232,774  2/1941  Deninson _____ 352—43

NORTON ANSHER, Primary Examiner

R. A. WINTERCORN, Assistant Examiner

U.S. Cl. X.R.

352—43, 58, 70, 86.